United States Patent Office 3,397,958
Patented Aug. 20, 1968

3,397,958
PROCESS FOR THE PRODUCTION OF PURIFIED ALUMINUM NITRIDE
René Perieres, La Tronche, Isere, and Maurice Noble, Grenoble, Isere, France, assignors to Pechiney Compagnie de Produits Chimiques et Electrometallurgiques
No Drawing. Filed Aug. 8, 1966, Ser. No. 570,757
Claims priority, application France, Aug. 10, 1965, 27,827
6 Claims. (Cl. 23—192)

ABSTRACT OF THE DISCLOSURE

A process for production of aluminum nitride relatively free of iron, silicon, and titanium by treatment of a bauxite containing these impurities with carbon, nitrogen, and sulfur, under controlled conditions.

This invention relates to a process for the production of purified aluminum nitride from impure aluminous materials (aluminum oxide and other combined forms of aluminum).

It is known that a purified aluminum nitride can be obtained from impure aluminous materials containing silica by reaction with carbon at a temperature below 1800° C. in a stream of nitrogen. The nitride thus obtained contains up to 34% by weight of nitrogen, which corresponds to an aluminum nitride purity of 99.5%. The purified nitride is preferably treated with water to produce gaseous ammonia and purified alumina as the desirable end products. If iron is present in the ore, it will remain in the purified nitride as a metal impurity and can be eliminated by treatment with chlorine, without affecting the nitride.

Unfortunately, this state of the art is not consistent with experimental data. Even if it is assumed that the aluminum ore contains silica as the sole impurity, it has not been found possible, by the described process, to eliminate most of the silica present in the ore to obtain a product having a purity of 99.5% aluminum nitride. Further, the common aluminous ores, such as bauxite, usually contain, in addition to the siliceous impurities, ferruginous impurities (iron in combined or oxidized form) in amounts which sometimes are relatively high, as well as titanium oxide. It has been found that the nitride obtained by the process described contains all of the titanium and a large proportion of the iron and silicon originally present in the starting material. In addition, it has been found that in the conversion of the aluminum oxide to aluminum nitride in the presence of an excess of carbon, carbon remains in the nitride as an impurity. Subsequent treatment with chlorine enables only a part of the impurities to be eliminated. As a result, the purified aluminum nitride obtained is of insufficient purity for a number of industrial applications, particularly for the production of aluminum by pyrogenic decomposition of the nitride, for which purpose a high purity nitride is required.

On the other hand, it is possible by the process of this invention to produce aluminum nitride from impure aluminous materials which is free of almost all of the iron, silicon and titanium present in the starting material in the elementary or combined forms and it is possible, in conjunction with the effective purification, to convert the alumina present in the starting material to aluminum nitride of very high yields and it is an object of this invention to provide a method for accomplishing same.

It is an object of this invention to provide a process for the production of solid aluminum nitride which is practically free of impurities of iron, silicon and titanium, which is easily and efficiently carried out with readily available materials and equipment and in which the loss of aluminum is maintained at a minimum.

In accordance with the practice of this invention, solid aluminum nitride which is relatively free of iron, silicon and titanium, in free or combined form, is achieved by treating the impure aluminous material containing silica, iron oxide and titanium oxide with carbon and sulphur at elevated temperature and in the presence of nitrogen. The aluminous material is brought into reactive contact with the carbon, sulphur and nitrogen at a temperature which is raised gradually from a minimum which can be as low as 275° C. and as high as 1000° C. to a maximum temperature of at least 1600° C. but less than 1750° C.

Carbon is employed in the reaction in an amount within the range of 1 to 1.6 times and preferably 1.2 to 1.5 times the amount calculated to convert the oxides of aluminum, iron, silicon and titanium present to aluminum nitride, iron, silicon and titanium respectively, in accordance with the following equations:

$$Al_2O_3 + 3C + N_2 \rightarrow 2AlN + 3CO \qquad (1)$$
$$Fe_2O_3 + 3C \rightarrow 2Fe + 3CO \qquad (2)$$
$$SiO_2 + 2C \rightarrow Si + 2CO \qquad (3)$$
$$TiO_2 + 2C \rightarrow Ti + 2CO \qquad (4)$$

The sulphur is employed in a amount at least equal to that required to conver the silicon oxides present in the aluminous material to silicon monosulphide but not more than 1.6 times the amount required to convert the silicon, iron and titanium, present in the form of oxides in the aluminous ore, to the corresponding higher sulphides. The oygen in the oxides of iron and titanium is eliminated in the form of sulphur dioxide.

An aluminum ore, such as bauxite, may be used as the impure aluminous raw material. However, depending upon the iron oxide content of the ore, it may be desirable to effect a prereduction of the ore, either completely or partly, by a conventional reducing agent, such as hydrogen, carbon, or carbon monoxide. It is possible, in this way, to prepare an intermediate product which may be used as the aluminous starting material in the process of this invention.

If the quantity of carbon used in the starting materials, treated in accordance with this invention, is less than a minimum quantity, as previously described, it is impossible to obtain complete nitridation, while the melting point of the charge thus treated is lowered.

In calculating the minimum of carbon required, part of the total amount of sulphur required to reduce the oxides of iron and titanium to the metallic state may be calculated as carbon or as an equivalent of carbon. It may be said that, in calculating the minimum amount of carbon required, the sulphur cannot be used to replace carbon either in the reduction of the silicon oxide or in the nitridation of the aluminum oxide. If the amount of sulphur used in the process of this invention is less than the specified minimum, elimination of the metal impurities becomes incomplete. The amount of sulphur is selected preferably not to exceed that required to convert the silicon, iron and titanium to the respective mono sulphides. The amount of sulphur must be small enough to avoid formation of aluminum sulphide. The sulphur may be used in the combined state and/or in the free state. Sulphurous cokes may be used, in which event the sulphur provided by the carbon may be used to advantage. In the instance where all of the sulphur is provided in the form of a sulphurous coke, the minimum reaction temperature for the treatment should be at least 1000° C. The sulphur may be added to the mixture of ore and carbon and/or it may be introduced after one or more of the carbothermic reactions 1 to 4 as defined above have been initiated. It may be introduced in solid and/or in vapor form.

Iron may be incorporated into the impure aluminous material, either in the elementary or in the combined state, such as in the form of the oxide or sulphide. Such addition can be made to facilitate the elimination of impurities such as silicon, titanium and their oxides.

The solid starting materials are intimately mixed and used either in bulk and/or as agglomerates.

In the preferred embodiment of the invention, the rate of flow of nitrogen is regulated to keep the nitrogen content in the gaseous mixture issuing from the reaction zone at least equal to that corresponding to the thermodynamic equilibrium data at the temperature at which the alumina present in the bauxite is nitrided in accordance with Reaction 1. At the thermodynamic equilibrium of the nitridation reaction at temperatures in the range of 1600° to 1750° C., the gaseous phase in equilibrium offers a well defined composition for each temperature. The aforementioned thermodynamic equilibrium data to be taken into consideration are preferably defined by experimentally determined values as follows: the carbon monoxide content of the binary mixture of carbon monoxide and nitrogen emanating from the nitridation zone is approximately 10% by volume at 1500° C.; 30% by volume at 1600° C.; 60% by volume at 1700° C., and 85% by volume at 1800° C. The carbon monoxide content of the gaseous mixture leaving the nitridation zone may be measured by any known means, such as by absorption in cuprammonium, or by means of an analyzer based upon the fading of an infra-red radiation.

In instances where a high aluminum nitride content is required, nitridation may be continued until the residual alumina content is less than 2% or even less than 0.5%. Nitridation may be carried out either continuously or in batches, in a fixed bed or a fluidized bed, or in a rotary furnace and the like.

In instances where the maximum temperature used for treatment is less than 1600° C., nitridation is either incomplete or proceeds very slowly. If the aforementioned upper temperature exceeds 1750° C., caking occurs and the porosity of the charge deteriorates until it becomes inadequate such that nitridation is almost impossible to obtain.

In the preferred embodiment of the invention, the product obtained after nitridation in the presence of sulphur is subjected to the action of chlorine gas at a temperature within the range of 200° to 650° C., preferably within the range of 450° to 550° C. The chlorine may be diluted with an inert gas, such as nitrogen, at the rate of 5 to 15 volumes per volume of chlorine. Under such circumstances, the selectivity of the action of chlorine on impurities will be improved.

If chlorination is carried out at a temperature below 200° C., the metal impurities are not satisfactorily eliminated. On the other hand, a chlorination temperature above 650° C. impairs selectivity of reaction and results in losses of aluminum.

Chlorination is generally continued until elimination of impurities is practically completed. Its duration will depend upon the quality of the starting material.

By reason of the presence of sulphur in the carbothermic treatment, the ferruginous (iron oxide and other combined forms of iron), titaniferous (titanium oxide and other combined forms of titanium), and siliciferous (silicon oxide and other combined forms of silicon) impurities become more sensitive to the action of chlorine, i.e. they become able to become eliminated by chlorine more readily, more completely and/or at a lower temperature than in the absence of sulphur in the treatment. This greater sensitivity to the action of chlorine is one of the features of the invention.

In the process of the invention, the charge is not sintered during the nitridation reaction while its permeability to gases remains excellent. As a result, both the nitriding gases and the chlorinating gases are more effective. The amount of aluminum lost during chlorination is negligible, generally less than 1%.

After nitridation, followed optionally by chlorination, the product will generally contain between about 2% to 12% carbon. This residual carbon emanates from the excess of carbon employed in the treatment. The residual carbon can be eliminated without attack on the nitride by selective oxidation of the carbon present in the aluminum nitride. For this purpose, the aluminum nitride, with the residual carbon, is heated, and optionally followed by chlorination, to a temperature within the range of 600° to 800° C. in the presence of an oxygen containing gas. When chlorination is employed, the chlorinating step is completed before the carbon is selectively oxidized. By way of explanation of the described sequence of operations, it is believed that the iron, silicon and titanium are obtained, on completion of nitridation, in reduced forms which are sensitive to the purifying action of chlorine. These reduced forms are then converted, during selective oxidation, into oxidized forms on which chlorine has little, if any, purifying effect.

The purity of the aluminum nitride prepared in accordance with the practice of this invention will vary, depending somewhat upon the content of impurities in the starting material, and more or less upon the stringent conditions under which the nitridation and chlorination steps are performed. In a preferred embodiment, it is possible to obtain at least 98% and in some cases 99.5% by weight pure aluminum nitride with the remainder consisting essentially of residual alumina.

The following examples are given by way of comparison, and not by way of limitation, to demonstrate the advantages resulting from the practice of this invention. The tests on which these examples are based were carried out with the same batch of bauxite from the WEIPA deposit in Australia. Similar tests conducted with relatively pure bauxites from Dutch Guiana and the ferruginous bauxites from Brignoles in France, confirm the general scope of the invention. After calcination at 800° C., the WEIPA bauxites had the following mean gravimetric composition: Al=40.86%, Fe=6.84%, Si=2.21%, Ti=2.02%.

The difference between Examples 2 and 4 and Examples 1 and 3 is that, in addition to nitridation, Examples 2 and 4 include subsequent purification by treatment with chlorine while Examples 1 and 3 only comprise nitridation without subsequent chlorination.

In Examples 1 and 2, which do not represent the practice of the invention, a finely powdered and then agglomerated mixture of 100 kg. of bauxite and 45 kg. of sulphur-free coke is heated for a period of 6 hours at a temperature of 1700° C. The treatment was carried out in a vertical graphite furnace having an internal diameter of 25 cm. with a stream of nitrogen flowing through at a rate of 160 liters per minute.

In Examples 3 and 4, a finely powdered and then agglomerated mixture of 50 kg. of sulphurous coke containing 7% by weight sulphur and 100 kg. of bauxite is subjected to the nitridation step. In Examples 3 and 4, the conditions with reference to reaction temperature, time, apparatus and the flow rate of nitrogen were maintained the same as those employed in Examples 1 and 2.

The chlorination treatments of Examples 2 and 4 were carried out by subjecting the product obtained in accordance with Examples 1 and 3 to the action of a mixture of 10 volumes of nitrogen and 1 volume of chlorine at 500° C. for a period of 6 hours in a horizontal muffle furnace of silica.

|    |                            | Examples |      |       |       |
|----|----------------------------|----------|------|-------|-------|
|    |                            | 1        | 2    | 3     | 4     |
| Fe | Residual Fe (Percent)      | 4.58     | 1.23 | 1.77  | 0.055 |
|    | Fe eliminated (Percent)    | 45.3     | 85.7 | 77.6  | 99.3  |
| Si | Residual Si (Percent)      | 2.12     | 1.42 | 0.034 | 0.010 |
|    | Si eliminated (Percent)    | 19.8     | 50.9 | 98.7  | 99.6  |
| Ti | Residual Ti (Percent)      | 2.4      | 1.26 | 2.40  | 0.010 |
|    | Ti eliminated (Percent)    | 0        | 50.0 | 0     | 99.6  |

In the table, the aluminum nitride content of the products is calculated to make up the difference to 100% after taking into account a carbon content of 0.05 to 0.2%.

Comparison of Examples 2 and 4, which include the chlorination step, with Examples 1 and 3, which do not include the chlorination step, illustrates that on the one hand it is possible by subsequent chlorination to eliminate a certain proporation of the ferruginous and titaniferous impurities although no improvement in the silicon content is observed. On the other hand, in the instances where nitridation is carried out with sulphur, as in Examples 3 and 4, it is possible by subsequent chlorination to effect a much better elimination of all of the impurities, i.e., both the iron and titanium, as well as the silicon, in substantial proporations.

Comparison of Example 1, which does not represent the invention, with Example 3, which does represent the invention, demonstrates the vast improvement obtained in the elimination of silicon in the nitridation step when sulphur is present as one of the reactants.

It is possible without departing from the spirit of the invention to replace chlorine with other chlorinating agents or with agents which liberate chlorine under the conditions of the reaction.

It will be understood that changes may be made in the details of formulation and conditions of operation without departing from the spirit of the invention, especially as defined in the following claims.

We claim:
1. A process for the production of solid aluminum nitride which is relatively free of iron, silicon and titanium impurities in elemental or combined form from an impure aluminous material containing silica, iron oxide and titanium dioxide comprising the step of treating the impure aluminous material in finely divided solid state with carbon, nitrogen and sulphur at a temperature which is raised gradually from a minimum within the range of 275° to 1000° C. to a maximum within the range of 1600° to 1750° C., in which the carbon is present in an amount within the range of 1 to 1.6 times the quantity theoretically required for conversion of the oxides of aluminum, iron, silicon and titanium present in the impure aluminous material to aluminum nitride, iron, silicon and titanium, in which sulphur is present in an amount which is at least equal to the amount required for conversion of the silicon present as an oxide to silicon monosulphide but not more than 1.6 times the quantity required for conversion of silicon, iron and titanium to their corresponding higher sulphides to avoid formation of aluminum sulphide.

2. The process as claimed in claim 1 which includes the step of chlorinating the product of claim 1 at a temperature within the range of 200° to 650° C.

3. The process as claimed in claim 2 in which the chlorination reaction is carried out at a temperature within the range of 450° to 550° C.

4. The process as claimed in claim 2 in which the chlorination reaction is carried out with chlorine gas.

5. The process as claimed in claim 1 in which the aluminous raw material is bauxite.

6. The process as claimed in claim 1 in which the silicon oxide present in the ore is converted to silicon monosulphide.

References Cited
UNITED STATES PATENTS

| | | | |
|---|---|---|---|
| 1,772,936 | 4/1925  | Haglund        | 23—142 |
| 2,962,359 | 11/1960 | Perieres et al.| 23—192 |
| 3,009,778 | 11/1961 | Tardieu et al. | 23—142 |
| 3,216,794 | 11/1965 | Roschuk et al. | 23—142 |
| 3,248,171 | 4/1966  | Noble et al.   | 23—192 |

FOREIGN PATENTS 295,227  8/1928  Great Britain.

OSCAR R. VERTIZ, *Primary Examiner.*

G. PETERS, *Assistant Examiner.*